US007725395B2

(12) United States Patent
Rui et al.

(10) Patent No.: US 7,725,395 B2
(45) Date of Patent: May 25, 2010

(54) SYSTEM AND METHOD FOR DEVISING A HUMAN INTERACTIVE PROOF THAT DETERMINES WHETHER A REMOTE CLIENT IS A HUMAN OR A COMPUTER PROGRAM

(75) Inventors: Yong Rui, Sammamish, WA (US); Zicheng Liu, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 1577 days.

(21) Appl. No.: 10/664,657

(22) Filed: Sep. 19, 2003

(65) Prior Publication Data

US 2005/0065802 A1    Mar. 24, 2005

(51) Int. Cl.
G06Q 99/00 (2006.01)
(52) U.S. Cl. .............................. 705/50; 705/1; 382/355
(58) Field of Classification Search .................. 382/216, 382/181, 155; 705/1, 50; 706/1; 713/188
See application file for complete search history.

(56) References Cited

U.S. PATENT DOCUMENTS

| 5,732,148 A * | 3/1998 | Keagy et al. ................ 382/124 |
| 5,737,439 A * | 4/1998 | Lapsley et al. .............. 382/115 |
| 6,549,200 B1 * | 4/2003 | Mortlock et al. ............ 345/419 |
| 2002/0120853 A1 * | 8/2002 | Tyree ......................... 713/188 |

OTHER PUBLICATIONS

Mori, Greg and Malik, Juterandra "Estimating Human Body Configuations using Shape Context Mactching". Oct. 14, 2001 University of California, Berkley.*

Von Ahn, Luis et al. "CAPTCHA: Using Hard AI Problems For Security". May 6, 2003, Eurocrypt Conference 2003, Warsaw, Poland.*

Robinson, S., "Up to the Challenge: Computer Scientists Crack a Set of AI-based Puzzles", http://zeno.siam.org.*

Ahn, L., M. Blum, N. J. Hopper, Telling humans and computers apart (Automatically) or How lazy cryptographers do AI, *Technical Report* CMU-CS-02-117, Feb. 2002.

Baird, H. S., and K. Popat, Human interactive proofs and document image analysis, *Proc. 5th IAPR Workshop on Document Analysis Systems*, Princeton, N.J., Aug. 19-21, 2002.

CAPTCHA website, http://www.captcha.net, 2000.

Chew, M., and H. S. Baird, BaffleText: A human interactive proof, *Proc. 10th IS&T/SPIE Document Recognition & Retrieval Conf.*, Santa Clara, CA, Jan. 22, 2003.

Coates, A., H. Baird, and R. Fateman, Pessimal print: A reverse Turing test, *Proc. IAPR 6th Int'l Conf. on Document Analysis and Recognition*, Seattle, WA, Sep. 10-13, 2001, pp. 1154-1158.

* cited by examiner

*Primary Examiner*—Jalatee Worjloh
(74) *Attorney, Agent, or Firm*—Lyon & Harr, LLP; Katrina A. Lyon (57) ABSTRACT

A system and method for automatically determining if a remote client is a human or a computer. A set of HIP design guidelines which are important to ensure the security and usability of a HIP system are described. Furthermore, one embodiment of this new HIP system and method is based on human face and facial feature detection. Because human face is the most familiar object to all human users the embodiment of the invention employing a face is possibly the most universal HIP system so far.

22 Claims, 8 Drawing Sheets

SYSTEM AND METHOD FOR DEVISING A HUMAN INTERACTIVE PROOF THAT DETERMINES WHETHER A REMOTE CLIENT IS A HUMAN OR A COMPUTER PROGRAM

BACKGROUND

1. Technical Field

This invention is directed toward a system and method for determining whether a computer user is a human or a computer program. More specifically, the invention is directed toward a system and method for devising a Human Interactive Proof that determines whether a computer user is a human or a computer program.

2. Background Art

Web services are increasingly becoming part of people's everyday life. For example, free email accounts are used to send and receive emails; online polls are used to gather people's opinion; and chat rooms are used to permit online users to socialize with others. However, all these web services designed for human use are being abused by computer programs (bots). A bot is any type of autonomous software that operates as an agent for a user or a program or simulates a human activity. There are various types of bots. On the Internet, the most popular bots are programs (called spiders or crawlers) used for searching. They access web sites, retrieve documents and follow all the hyperlinks in them; then they generate catalogs that are accessed by search engines. A chatbot converses with humans (or other bots). A shopbot searches the Web to find the best price for a product. Other bots observe a user's patterns in navigating a web site and customize the site for that user. Knowbots collect specific information from websites.

Many of the aforementioned types of bots are being maliciously used. For example, Hotmail, Yahoo and others provide free email services. Unfortunately malicious programmers have designed bots to register thousands of free email accounts every minute so that they can send thousands of junk emails. Online polling is a convenient and cost-effective way to obtain people's opinions. However, when these on-line polls are abused by bots, their credibility reduces to zero. In the information age, people use online chat rooms to socialize with others. However, bots have started to join chat rooms and point people to advertisement sites. In the case of E-commerce, a malicious programmer can design a bot whose task is to aggregate prices from other E-commerce sites. Based on the collected prices, the malicious programmer can make his or her price a little cheaper, thus stealing away other sites' customers. Similar situations arise with search engine sites.

Presently there exist several Human Interactive Proof (HIP) algorithms that determine whether a computer user is a human or a bot. For example, there are several programs that can generate and grade tests capable of being passed by humans, that are beyond the capabilities of many computer programs. One such program, named Gimpy, picks seven random words out of a dictionary, distorts them and renders them to users. The user needs to recognize three out of the seven words to prove that he or she is a human user. Because words in Gimpy overlap and undergo non-linear transformations, they pose serious challenges to existing OCR systems. However, they also pose a significant burden on human users. This burden was so much that Yahoo pulled Gimpy from its website and replaced it with an easier version, EZ Gimpy. EZ Gimpy shows a user a single word over a cluttered background. Another program, Bongo, presents a user with two groups of visual patterns (e.g., lines, circles and squares), named LEFT and RIGHT. It then shows new visual patterns and asks the user to decide if the new patterns belong to LEFT or RIGHT. There are some programs, for example Pix and Animal Pix, that rely on a large database of labeled images. They first randomly pick an object label (e.g., flower, baby, lion, etc.) from the label list, and then randomly select images containing that object from the database, and show the images to a user. The user needs to enter the correct object label to prove he or she is a human user. In addition to the above visual HIP designs, there also exist audio challenges, e.g., Byan 0 and Eco 0. The general idea is to add noise and reverberation to clean speech such that existing speech recognizers can no longer recognize it. The audio challenges are complementary to the visual ones and are especially useful to vision-impaired users.

The aforementioned HIP systems suffer from various deficiencies in ease of use, resistance to attack, dependency on databases, and lack of universality. For instance, some of these HIP tests are cumbersome and time-consuming for a human to take. Some of these methods employ techniques that have not been investigated extensively and are based on technologies that are evolving which could impact the usability of these tests in the future. Furthermore, some of the tests are dependent on the user's language, physical location, and education, among others, and are therefore not universal. It is expensive for such companies to localize a HIP test to numerous different languages. Additionally, some of the tests are not resistant to no-effort attacks. No-effort attacks are the ones that can solve a HIP test without solving a hard artificial intelligence (AI) problem. As an example, Bongo is a two-class classification challenge. To attack Bongo, the attacker needs no effort other than always guessing LEFT. This will guarantee the attacker to achieve 50% accuracy. Even if Bongo can ask a user to solve 4 tests together, that still gives no-effort attacks 1/16 accuracy. Some of the aforementioned tests are also easy to attack when the database they use is publicized. For example, both Pix and Animal Pix would be very easy to attack once the database is publicly available. They, therefore, are not good HIP tests. The evaluations of some of the existing approaches are summarized against these factors in Table 1. From Table 1, it is clear that most of the existing HIP algorithms suffer from one or more deficiencies.

TABLE 1

| Guidelines | Automation and gradability | 2. Easy to human | 3. Hard to machine | 4. Universality | 5. Resistance to no-effort attacks | 6. Robustness when database publicized |
|---|---|---|---|---|---|---|
| | | Evaluation of Existing HIP Tests. | | | | |
| Gimpy | Yes | Yes But the partially overlapped text can be hard to | Yes | No People who know English have much more | Yes | Yes |

TABLE 1-continued

Evaluation of Existing HIP Tests.

| Guidelines | Automation and gradability | 2. Easy to human | 3. Hard to machine | 4. Universality | 5. Resistance to no-effort attacks | 6. Robustness when database publicized |
|---|---|---|---|---|---|---|
| EZ Gimpy | Yes | recognize 0 Yes | No It has been broken 0 | advantages Yes | Yes | No Has only 850 words 0 |
| Bongo | Yes | Yes | Yes | Yes | No A machine can randomly guess an answer | Yes |
| Pix | Yes But the labels can be ambiguous (cars vs. White cars) | Yes | Yes | No Some objects do not exist in some countries. | Yes | No With the database, it becomes simple image matching. |
| Animal Pix | Yes | Yes | Yes | No Some animals are only popular in a few countries. | No A machine can randomly guess an answer | No With the database, it becomes simple image matching. |
| Pessimal | Yes | Yes | Yes | No People who know English have much more advantages | Yes | No Has only 70 words 00 |
| BaffleText | Yes | Yes But has been attacked when using single font 0 | Yes | Yes But people who know English may have advantages | Yes | Yes |
| Byan | Yes | Yes | Yes | No Users need to know English | Yes | Yes |

Human faces are arguably the most familiar objects to humans, rendering them possibly the best candidate for a HIP. Regardless of nationalities, culture differences or educational background, all humans recognize human faces. In fact, this ability is so good that humans can recognize human faces even if they are distorted, partially occluded, or in bad lighting conditions.

Computer vision researchers have long been interested in developing automated face detection algorithms. These face detector algorithms could conceivably be used to attack a HIP test that employs a face. In general, face detection algorithms can be classified into four categories. The first is the knowledge-based approach. Based on people's common knowledge about faces, this approach uses a set of rules to perform detection. The second approach is feature-based. It first detects local facial features, e.g., eyes, nose and mouth, and then infers the presence of a face. The third approach is based on template matching. A parameterized face pattern is pre-designed manually, and then used as a template to locate faces in an image. The fourth approach is appearance-based. Instead of using pre-designed templates, it learns the templates from a set of training examples. So far, the fourth approach is the most successful one 0.

However, in spite of decades of hard research on face and facial feature detection, today's best detectors still suffer from limitations relating to lighting, face symmetry, shading and cluttered backgrounds. Here are some example limitations:

1. Head Orientations. Head orientation often causes problems for face and feature detectors. Let the x axis point to the right of the paper, the y axis point to the top of the paper, and the z axis point out of the paper. All face detectors handle frontal faces well. That is, they work well when there is no rotation around any of the three axes. They can also handle rotations around the y axis to some extent, but their performance is worse than for detecting frontal view faces. They do not handle rotations around the x and z axes well.

2. Face Symmetry. With respect to face symmetry, face detectors assume, either explicitly or implicitly, that the faces are symmetric, e.g., the left eye and right eye are roughly of the same height, and are roughly of the same distance from the nose bridge. Problems can occur in detecting faces when this is not the case.

3. Lighting and Shading. Face detectors rely on different intensity levels of landmarks on human faces. For example, they assume that the two eyes are darker than the surrounding region, and the mouth/lip region is also darker than the rest of the face. When a face image is taken under very low or high lighting conditions, the image's dynamic range decreases. This in turn results in difficulties in finding the landmark regions in faces. In addition, lighting also creates shading which further complicates face detection.

4. Cluttered Background. If face-like clutters exist in the background of the face image, the face detectors can be further distracted. The above four conditions are provided as limitations employed by one embodiment of the invention, however, other limitations could equally well be used.

Therefore, what is needed is a system and method that can create a human interactive proof that can consistently and correctly distinguish a human computer user from a bot. Such a system should preferably provide for ease of use, resistance to attack, universality and not depend on a database.

SUMMARY

The invention is directed toward a system and method for determining if a computer user is a human or a bot. This system and method for creating a Human Interactive Proof (HIP) is based on detecting one or more bodies, or parts thereof, in an image. The HIP designed by the system and method according to the invention, is easy for humans, hard for bots, universal, survives no-effort attacks and does not require a database. The system and method of the invention is based on both theoretical and practical considerations and a set of HIP design guidelines which ensure a HIP system to be secure and usable. One embodiment of the invention employs human faces in deriving a HIP. In other embodiments, the system and method according to the invention uses other body parts, or the whole body, in devising a HIP.

In one embodiment the system and method according to the invention is arranged in a server client configuration. The client sends a request to the server (e.g., for an account). The server then generates an image of one or more bodies, or parts thereof, while saving the coordinates of the ground truth of feature points of the respective bodies or parts, and sends the image to the client. The client then identifies the feature points in the image, providing these to the server. The server then checks the correctness of the location of these feature points by comparing the client input to the ground truth. If the input is within acceptable limits compared to ground truth, then the server identifies the client as a human. Otherwise, the server identifies the client as a bot.

More specifically, in one embodiment, the system and method according to the invention automatically synthesizes an image of a distorted face embedded in a cluttered background. The user is asked to first find the face and then point to a specified number of feature points (e.g., the four eye corners and two mouth corners) on the face with a computer input device (e.g., a keyboard of a mouse). If the user can correctly identify these points, the system concludes that the user is a human; otherwise, the system concludes that the user is a human; otherwise, the system concludes that the user is a machine or computer program.

In the embodiment of the invention employing faces, to generate the image that the server sends to the client, the only inputs to the algorithm are the 3D wire model of a generic head and a cylindrical texture map $T_m$ of an arbitrary person (e.g., 512×512 pixels in one embodiment). Note that any person's texture map will work in the system and from that single texture map it is possible in theory to generate infinite number of test images. The output is a test image $I_F$ with ground truth (i.e., face location and facial feature locations).

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

FIG. 4 shows (a) a 3D wire model of a generic head; and (b) The cylindrical head texture map of an arbitrary person.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
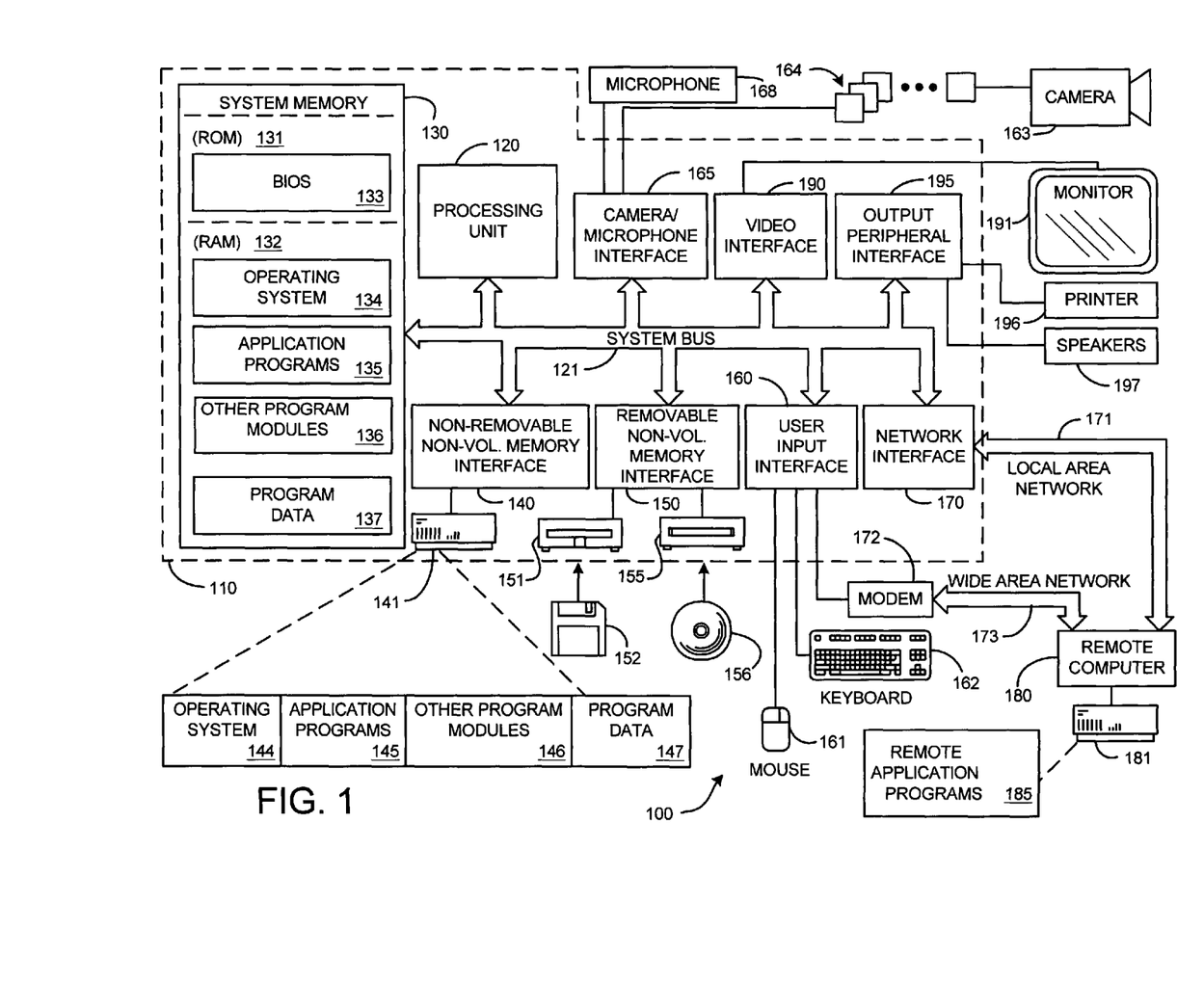
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Devising a Human Interactive Proof that Determine Whether a Remote Client is a Human or a Computer Program.

The following sections provide an overview of the system and method according to the invention, new guidelines for creating a Human Interactive Proof (HIP), and an example of the generation of a HIP using faces according to the invention. Results of attack testing of one exemplary embodiment of the invention employing faces is also discussed.

2.1 General Overview.

Figure 2:
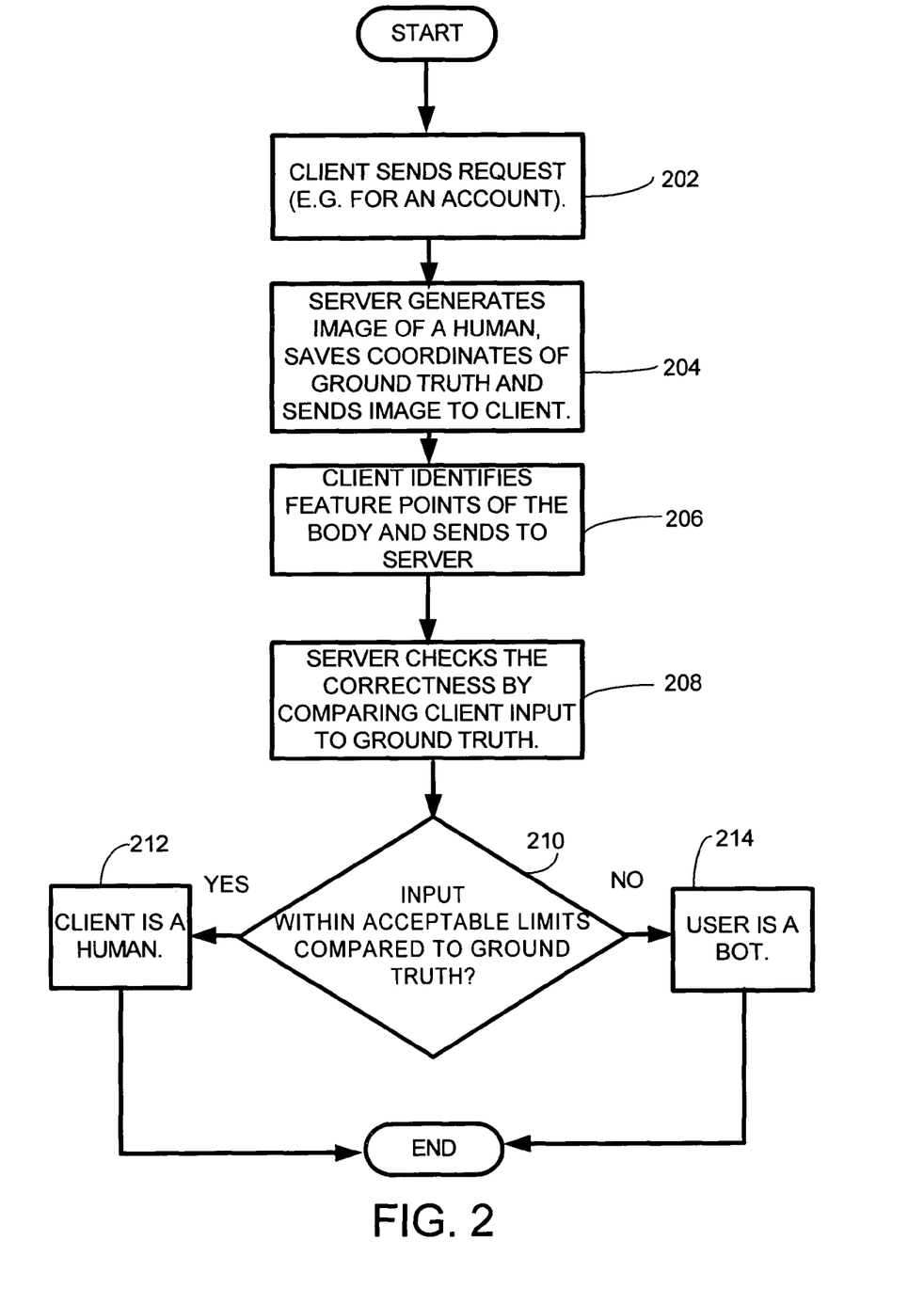
FIG. 2 is a simplified flow diagram of the overall process of generating a HIP that uses a body, or part thereof, according to the invention.

One embodiment the system and method according to the invention is arranged in a server client configuration. As shown in FIG. 2, process action 202, the client sends a request to the server (e.g., for an email account). The server then generates an image of a body, or part thereof, while saving the coordinates of the ground truth of feature points of the body, or part thereof, and sends the image to the client (process action 204). The client identifies the feature points in the image, and provides them to the server (process action 206). In one embodiment of the invention the client points to the locations of the feature points with a computer input device, such as, for example, a mouse. It should be noted that the HIP system of the invention only needs a pointing device such as a mouse or a digital pen device. No other HIP system is known that only uses a pointing device. In the cases where keyboard inputs are difficult to obtain, such as on a mobile device, the HIP system of the invention is more convenient. Once the client's input has been received, the server checks the correctness of the location of these feature points by comparing the client input to the ground truth, as shown in process action 208. If the input is within acceptable limits compared to ground truth, then the server identifies the client as a human (process actions 210 and 212). Otherwise, the server identifies the client as a bot (process action 214).

In one embodiment, the system and method according to the invention automatically synthesizes an image with a distorted face embedded in a cluttered background. The user is asked to first find the face and then identify the location of a specified number of feature points (e.g., the four eye corners and two mouth corners) on the face. If the user can correctly identify these points, the system concludes that the user is a human; otherwise, the system concludes that the user is a computer program.

Figure 3:
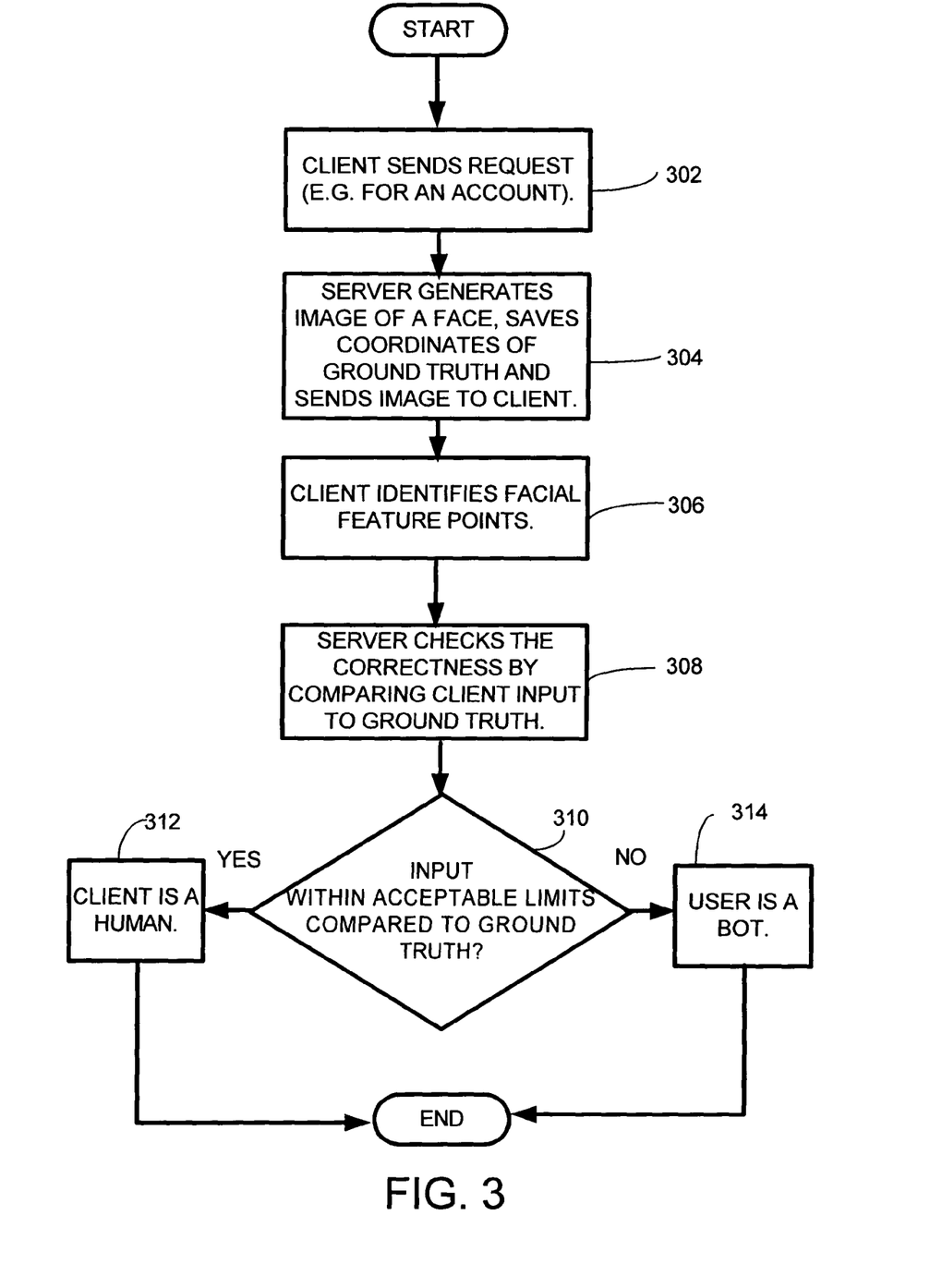
FIG. 3 is a simplified flow diagram of the overall process of generating a HIP that uses a face according to the invention.

More specifically, as shown in FIG. 3, with respect to this embodiment, when viewed from a server-client point of view, the client sends a request to the server (process action 302). The server then generates an image of a human face, while saving the coordinates of the ground truth of feature points of the face in the image, and then sends this image to the client (process action 304). The client then identifies the feature points of the face in the image, providing these to the server (process action 306). The server checks the correctness of the location of these facial feature points by comparing the client input to the ground truth locations of these facial feature points (process action 308). If the client's input with respect to the ground truth location of the feature points is within an acceptable distance, then the server identifies the client as a human (process actions 310 and 312), else the server identifies the client as a bot (process action 314).

2.2 Guidelines for Designing a Human Interactive Proof.

The system and method according to the invention employed a new set of guidelines in its design. These were:

1. Automation and gradability. The test should be automatically generated and graded by a machine.

2. Easy to human. The test should be quickly and easily taken by a human user. Any test that requires longer than 30 seconds becomes less useful in practice.

3. Hard to machine. The test should be based on a well-known problem which has been investigated extensively, and the best existing techniques are far from solving the problem.

4. Universality. The test should be independent of user's language, physical location, and education, among others. This guideline is motivated by practical considerations, and is especially important for companies with international customers. It is expensive for such companies to localize a HIP test to 20 different languages. As an example, any digits-based audio HIP tests are not universal because there is no universal language on digits (even though visually they are the same). A different HIP test would have to be implemented for each different language, thus this type of test is not cost effective.

5. Resistance to no-effort attacks. The test should survive no-effort attacks. No-effort attacks are the ones that can solve a HIP test without solving the hard AI problem. As an example, Bongo is a two-class classification challenge. To attack Bongo, the attacker needs no effort other than always guessing LEFT. This will guarantee the attacker to achieve 50% accuracy. Even if Bongo can ask a user to solve 4 tests together, that still gives no-effort attacks $\frac{1}{16}$ accuracy.

6. Robustness when database publicized. The test should be difficult to attack even if the database, from which the test is generated, is publicized. For example, both Pix and Animal Pix would be very easy to attack once the database is publicly available. They, therefore, are not good HIP tests.

However, the system and method according to the invention is not limited to employing just these six guidelines. Other guidelines could also be employed to generate a HIP according to the invention.

2.3 Generation of an Test Image.

This section provides a concrete example to illustrate how a test image is automatically generated, taking into account known limitations of face detectors. Specifically, the four face detector limitations discussed in the Background Section are used to derive a HIP using a human face. It is understood there exist many other ways, in fact endless ways, to generate the distorted face in a cluttered background. For clarity, F is used to indicate a foreground object in an image, e.g., a face; B to indicate the background in an image; I to indicate the whole image (i.e., foreground and background); and T to indicate cylindrical texture map.

Figure 4:
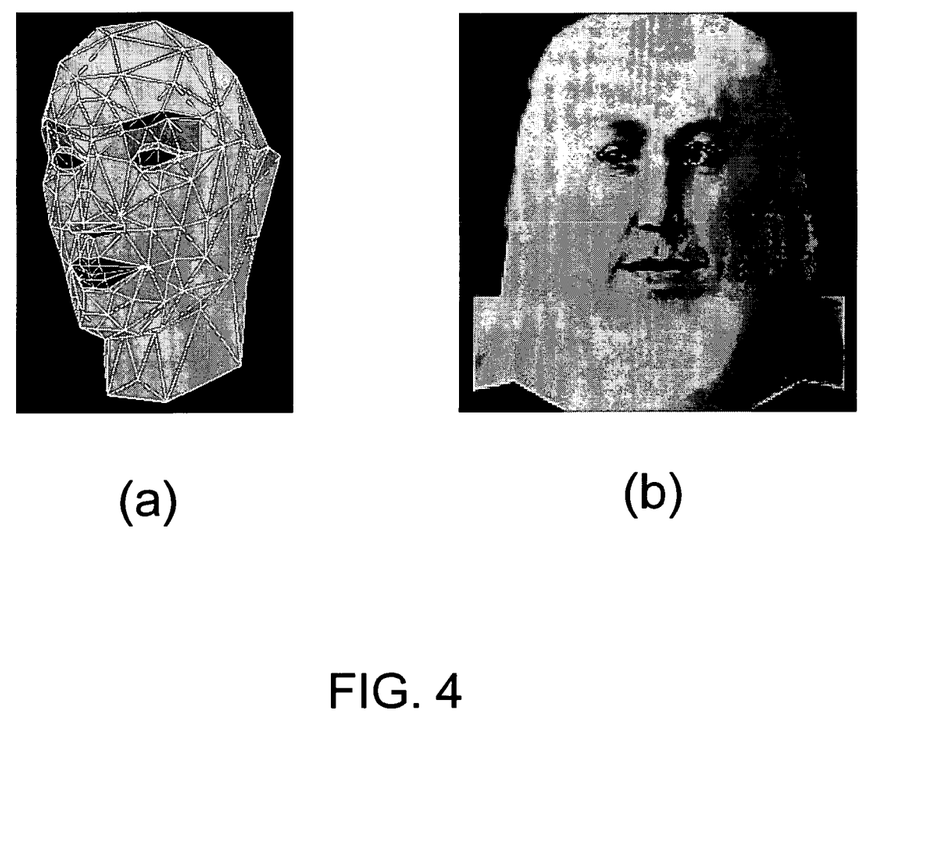

The only inputs to the system and method of one embodiment of the invention are a 3D wire model of a generic head (see FIG. 4(a)) and a cylindrical texture map $T_m$ of an arbitrary person (see FIG. 4(b)). Note that any person's texture map will work in the system and from that single texture map it is possible in theory to generate infinite number of test images. The output is a test image $I_F$ (see FIG. 5(d)) with ground truth (i.e., face location and facial feature locations).

Figure 6:
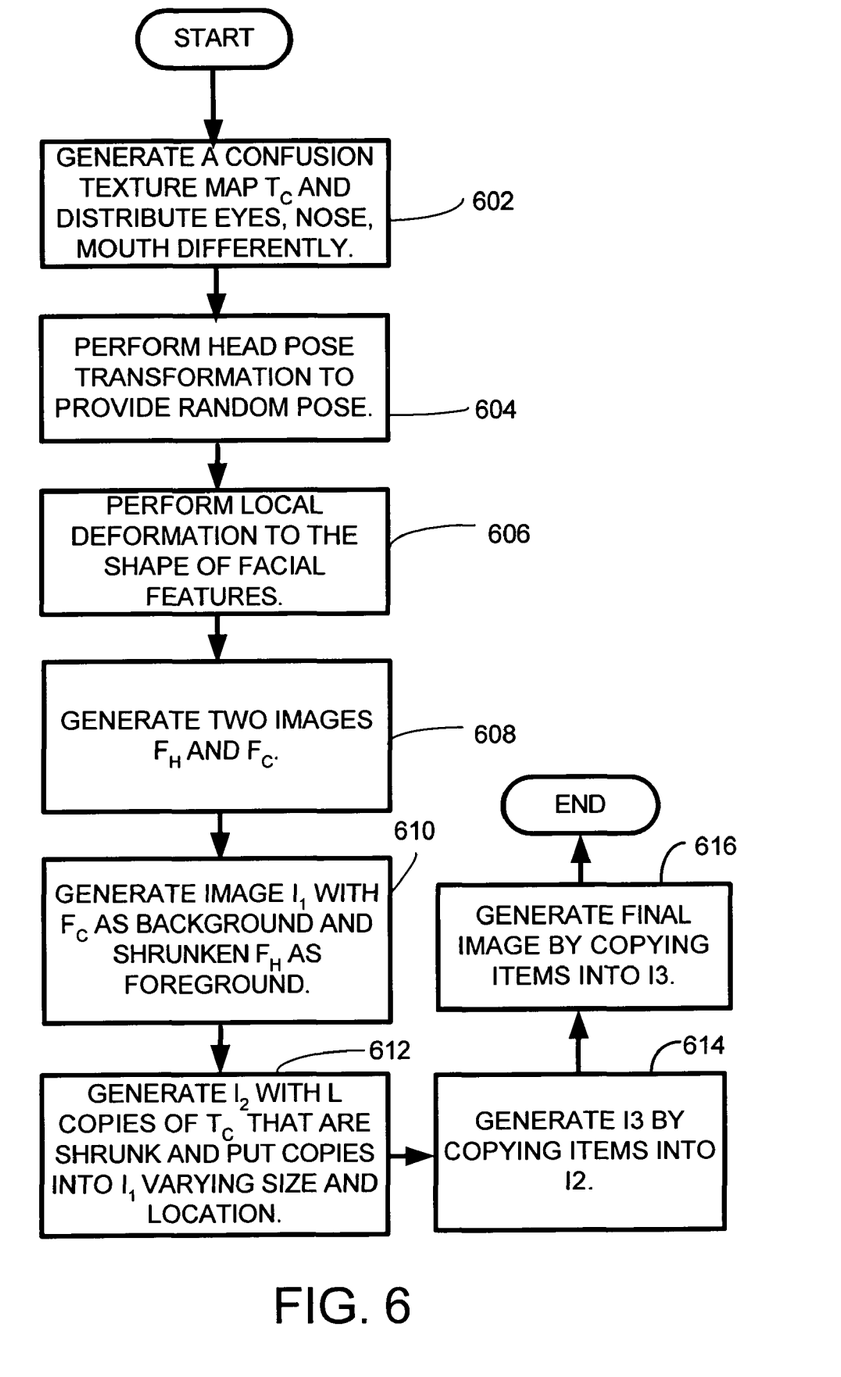
FIG. 6 depicts a flow diagram of generating a test image in one embodiment of the system and method according to the invention.

The general process of generating a test image in one embodiment of the invention is shown in FIG. 6. To generate the image that the server send to the client, the server first takes the input texture map $T_m$ and generates a confusion texture map, $T_c$, which distributes the eyes, nose and mouth differently, as shown in process action 602. A head pose transformation of the 3D wire model of the generic head is also performed to provide a random pose (process action 604). A local deformation of the shape of the facial features is also executed (process action 606). The local facial feature deformations are used to modify the facial feature positions so that they are slightly deviated from their original positions and shapes. Two images, $F_h$, and $F_c$, are then generated (process action 608). $F_h$ is a deformed and transformed mesh with a texture applied, while $F_c$ is an image with the same deformation and transformation as $F_h$, but with a different texture $T_c$ applied. An image, $I_1$, is then generated with $F_c$ as the background, and a shrunken $F_h$ as foreground, as shown in process action 610. An image, $I_2$, is then generated with L copies of $T_c$ that are scaled down in size and put into $I_1$ varying size and location (process action 612). As shown in process action 614, another image, $I_3$, is then generated by copying items into $I_2$. There are three steps in this stage. First, M copies of the confusion head, $F_c$, are made and randomly put into image $I_2$. Second, one now has M+1 regions in the image, where M of them come from $F_c$ and one from $F_h$. Let Avg(m), m=0, . . . , M+1, be the average intensity of region m. The intensities of each region m are remapped such that some of the regions become darker and others become brighter. Third, for each of the M+1 regions, opposite quadrants are randomly selected to under go further intensity changes. As shown in process action 616, the final test image $I_F$ is then generated. To do this, N copies of the facial feature regions in $F_h$ (e.g., eyes, nose, and mouth) are made and randomly put into $I_3$ to generate the final test image $I_F$.

The general process of creating a test image in one embodiment of the invention having been described, the following paragraphs provide details regarding these process actions for this embodiment.

2.3.1 Confusion Texture Map, $T_c$, Generation.

Figure 7:
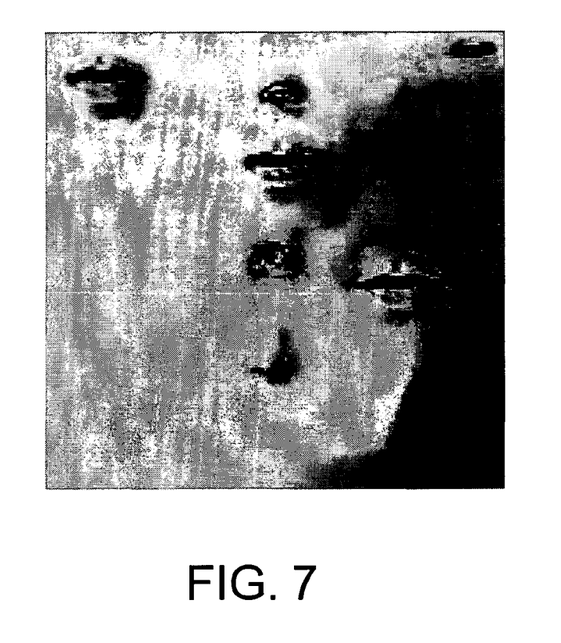
FIG. 7 depicts a confusion texture map, $T_c$, that is generated by randomly moving facial features (e.g., eyes, nose and mouth) in FIG. 4(b) to different places such that the "face" no longer looks like a face.

The Confusion Texture Map Generation process actions takes advantage of the "Cluttered Background" limitation to design the HIP test. The 512×512 confusion texture map, $T_c$, (see FIG. 7) is obtained by moving facial features (e.g., eyes, nose and mouth) in FIG. 4(b) to different places such that the "face" no longer looks like a face.

2.3.2 Global Head Transformation.

In the Global Head Transformation process action the head pose is transformed. Because the 3D wire model (see FIG. 4(a)) of a head is available, it is easy to generate any global head transformations desired. Specifically, the transformations include translation, scaling, and rotation of the head. This translation controls where the head is positioned in the final image $I_F$. Scaling controls the size of the head. Rotation can be around all the three x, y, and z axes. At run time, one randomly selects the global head transformation parameters and applies them to the 3D wire model texture-mapped with the input texture, Tm. This process takes advantage of the "Head Orientations" face detector limitation to design the HIP test.

2.3.3 Local Facial Feature Deformations.

Figure 8:
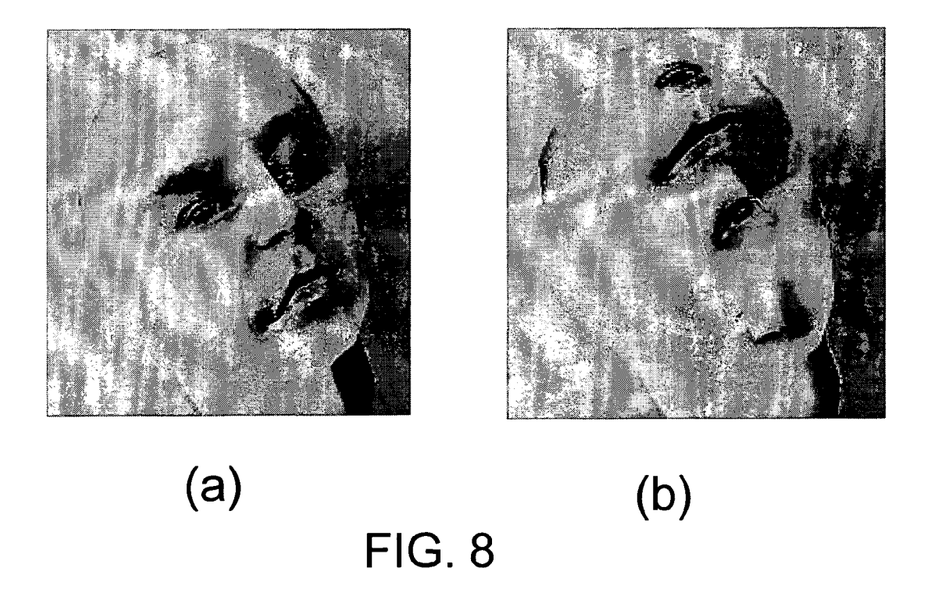
FIG. 8(a) depicts a head after global transformation and facial feature deformation. The head is denoted by $F_h$.
FIG. 8(b) depicts the confusion head after global transformation and facial feature deformation. This head is denoted by $F_c$.

The local facial feature deformations are used to modify the facial feature positions so that they are slightly deviated from their original positions and shapes. This deformation process takes advantage of the "Face Symmetry" limitation to design the HIP test. Each geometric deformation is represented as a vector of vertex differences. The system was designed to have a set of geometric deformations including the vertical and horizontal translations of the left eye, right eye, left eyebrow, right eyebrow, left mouth corner, and right mouth corner. Each geometric deformation is associated with a random coefficient uniformly distribution in [−1, 1], which controls the amount of deformation to be applied. At run time, the geometric deformation coefficients are randomly selected and applied to the 3D wire model. An example of a head after Steps 2 and 3 is shown in FIG. 8(a). Note that the head has been rotated and facial features deformed.

2.3.4 Confusion Texture Map Transformation and Deformation.

In this step, the same Steps 2 and 3 are applied to the confusion texture map, $T_c$, instead to $T_m$. This step generates the transformed and deformed confusion head $F_c$ as shown in FIG. 8(b).

2.3.5 Stage-1 Image $I_1$ Generation.

Figure 5:
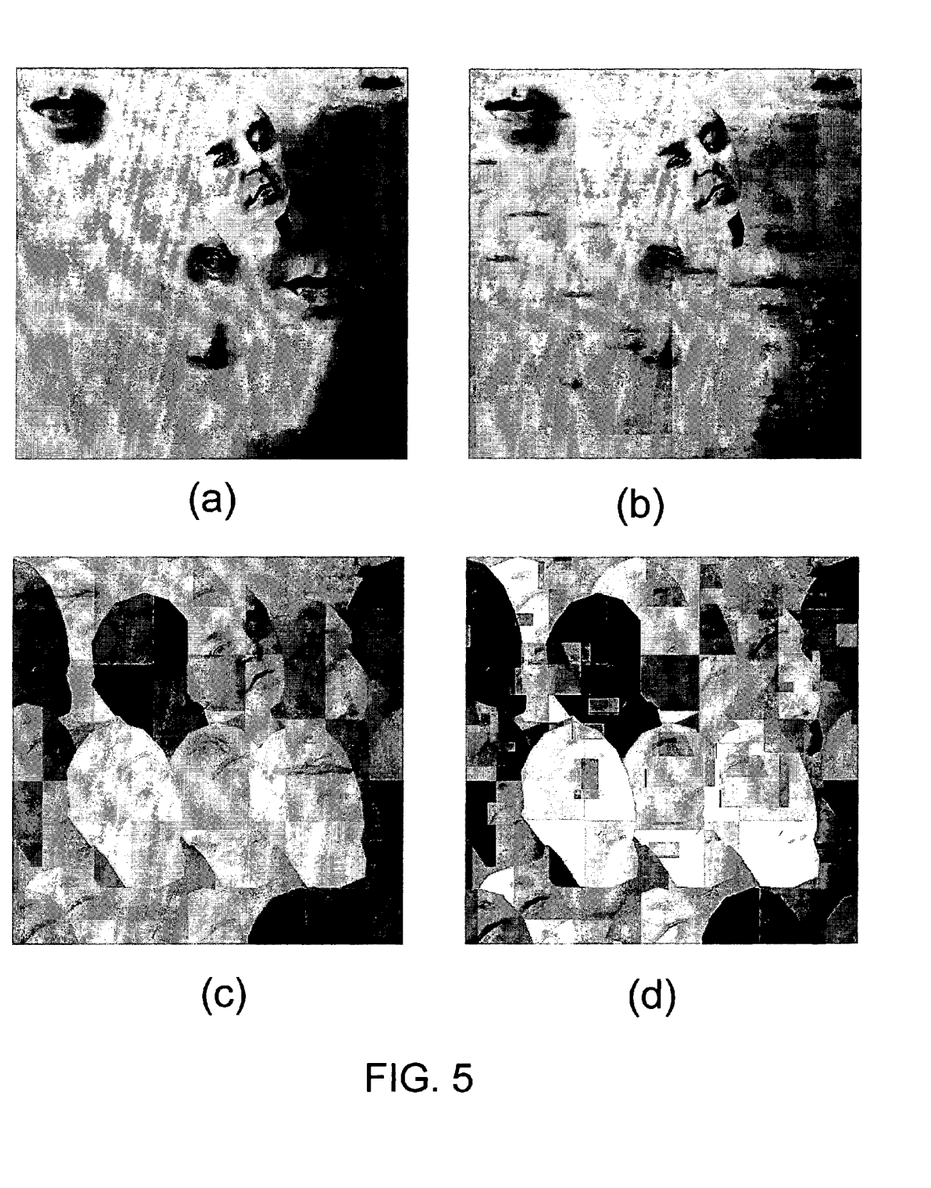
FIGS. 5(a) through 5(d) show different stages of the image generated for use in the HIP test by the system and method according to the invention.

The confusion texture map, $T_c$, is used as the background, B, and $F_h$ is used as the foreground to generate a 512×512 stage-1 image $I_1$ (see FIG. 5 (a)).

2.3.6 Stage-2 Image $I_2$ Generation.

To generate the $I_2$ image, L copies of randomly shrunk $T_c$ are made and randomly inserted into image $I_1$ to generate the 512×512 stage-2 image $I_2$ (see FIG. 5(b)). This process takes advantage of the "Cluttered Background" limitation to design the HIP test. Note that none of the copies should occlude the key face regions including eyes, nose and mouth. A mask is used to prevent this occlusion.

2.3.7 Stage-3 Image, $I_3$, Generation.

There are three steps in this stage. First, M copies of the confusion head $F_c$ are made and randomly put into image $I_2$. This step takes advantage of the "Cluttered Background" limitation associated with face detectors. Note that none of the copies should occlude the key face regions including eyes, nose and mouth, which is prevented by using a mask of these regions. Second, one now has M+1 regions in the image, where M of them come from $F_c$ and one from $F_h$. Let Avg(m), m=0, . . . , M+1, be the average intensity of region m. The intensities of each region m are remapped such that Avg(m)'s are uniformly distributed in [0,255] across the M+1 regions, i.e., some of the regions become darker and others become brighter. This step takes advantage of the "Lighting and Shading" limitation. Third, for each of the M+1 regions, a point within that region which divides the region into four quadrants is randomly selected. Two opposite quadrants are randomly selected to under go further intensity changes. If the average intensity of the region is greater than a given threshold (e.g., 128), the intensity of all the pixels in the selected quadrants will decrease by a randomly selected amount; otherwise, it will increase by a randomly selected amount. This step takes advantage of both the "Face Symmetry" and "Lighting and Shading" limitations. An example $I_3$ image is shown in FIG. 8(c). Note in the image that 1) the average intensities of the M+1 regions are uniformly distributed, i.e., some regions are darker while others are brighter; and 2) two of the quadrants undergo further intensity changes.

2.3.8 Final Test Image, $I_F$, Generation.

To generate the final test image, $I_F$, N copies of the facial feature regions in $F_h$ (e.g., eyes, nose, and mouth) are made and randomly put into $I_3$ to generate the final 512×512 test image $I_F$ (see FIG. 5(d)). This process takes advantage of the "Cluttered Background" limitation. Note that none of the copies should occlude the key face regions including eyes, nose and mouth. It should be noted that although an image size of 512×512 pixels was used in this embodiment, any image size could be used.

The above eight steps take the four exemplary face detection limitations into account and generate test images that make it very difficult for face detectors to detect a face. The above-described procedure was used to generate 1,000 images that were used in both a user study and in bot attacks.

It should be noted that although the foregoing paragraph provides one means of creating a test image employing a face, other methods could be used to generate a face for the user to locate. For example, steps can be omitted or the order could be switched and other steps to further distort the face or background could be used. The most effective methods of generating such a test image will take advantage of the known limitations in face detectors. There are virtually endless ways to generate a distorted face, any of which could be suitable to create the test image of the distorted face in a cluttered background.

The system and method according to the invention is advantageous in that it can generate a HIP that is easy for humans to decipher, but hard for computer programs or bots to decipher. The HIP generated by the system and method according to the invention is universal. It is equally easy for humans of all nationalities, regardless of the language they speak or write, or what alphabet they use. Furthermore, the HIP generated by the system and method of the invention survives no-effort attacks and does not require a database. Therefore, with respect to Table 1, the system and method of the invention meets all of the criteria.

3.0 Attacks of One Exemplary Embodiment of the Invention and Results.

One exemplary embodiment of the invention was subjected to bot attacks to determine its ability to distinguish a bot. To succeed in an attack, the attacker first had to locate the face from a test image's cluttered background by using a face detector, and then find the facial features (e.g., eyes, nose, and mouth) by using a facial feature detector. In this section, the results of attacks from three different face detectors and one face feature detector are presented.

3.3.1 Face Detectors.

The three face detectors used in the aforementioned attacks represent the state of the art in automatic face detection. The first face detector was developed by Colmenarez and Huang 0. It uses an information-based maximum discrimination (MD) to detect faces.

The second face detector was developed by Yang et. al. 0. It used a sparse network (SNoW) of linear functions and was tailored for learning in the presence of a very large number of features. It used a wide range of face images in different poses, with different expressions and under different lighting conditions.

The third face detector was developed by Li and his colleagues 0 following the Viola-Jones approach 0. They used AdaBoost to train a cascade of linear features, and had a very large database consisting of over 10,000 faces. Their system has been demonstrated live in various places and is regarded as one of the best existing face detectors.

Figure 9:
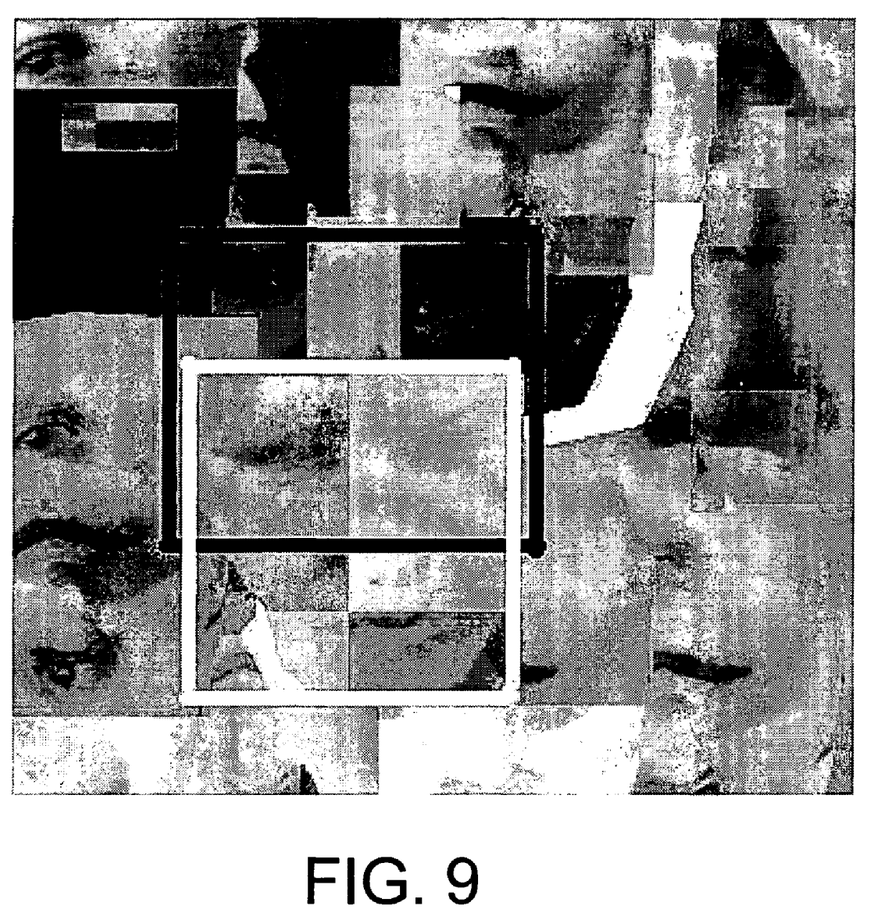
FIG. 9 depicts the Maximum Discrimination (MD) face detector's best detection out of the 1,000 attacks. The detected face region is shown with a black bounding box while the ground truth face region is shown with a white bounding box. The face detector is distracted by the two dark regions above the true face—the face detector identifies the two dark regions as left and right eye regions. Only part of the test image is shown for clarity.

The three face detectors were applied to attack the 1,000 images. When evaluating if an attack is successful, a very forgiving criterion was used for the face detectors. As long as the detected face region overlapped with the ground truth face region for 60% (or above), it was called a correct detection. The MD face detector had only one correct detection. The SNoW face detector had three correct detections. The AdaBoost face detector had zero correct detections. Comparing these results with the 99.7% detection rate of human users, it can be clearly seen that there is a big gap between the performance of the face detectors and the human users. FIG. 9 shows the only correctly detected face

TABLE 2

The number of images with 0, 1, 2, 3, 4, 5 and 6 correctly detected points.

| | Number of correctly detected points | | | | | |
|---|---|---|---|---|---|---|
| | 0 | 1 | 2 | 3 | 4 | 5 | 6 |
| Number of images | 509 | 257 | 114 | 79 | 33 | 6 | 2 | region (in black bounding box) detected by the MD face detector and the ground truth face region (in white bounding box). It is clear that even this "correct detection" is arguable as this face detector was apparently distracted by two dark regions above the true face.

3.3.2 Facial Feature Detector.

The facial feature detector proposed by Yan et. al. 0 is an improved version of the conventional Active Shape Model (ASM). It assumes that a face detector has already found the general location of the face region. It then searches for the facial features in that region. It works quite well with undistorted and clean faces 0.

Again, the same 1,000 images were used as the test set. During the attack, multiple advantages were given to the facial feature detector. First, the facial feature detector was told exactly where the true face is. Second, as long as the detected points were within twice the average mismatches human made, a correct detection was indicated. The summary of the detection results of the 1,000 test images is shown in Table 2. Even given the multiple advantages to the detector, the correct detection rate was only 0.2%.

3.3.3 Resistance to No-Effort Attacks.

As a final check, one embodiment of the invention's resistance to no-effort attacks was reviewed. The image size was 512×512 pixels and the face region about 128×128 pixels. It is easy to compute that there are (512−128)×(512−128)=147,456 possible face regions in the image. The chance for a no-effort attack for face detectors is therefore 1/147,456=6.8E-6. The chance for facial feature detectors to complete a no-effort attack can be similarly calculated. If the very forgiving mismatch tolerance region of 10×10 for each point is used, the chance for each point is (10×10)/(128×128) or 0.0061. For six points, $0.0061^6$ which equals 5.2E-14. The final success rate is the product of face detector and facial feature detector is 6.8E-6×5.2E-14 or 3.5E-19.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Ahn, L., Blum, M., and Hopper, N. J., Telling humans and computers apart (Automatically) or How lazy cryptographers do AI, Technical Report CMU-CS-02-117, February, 2002

[2] Baird, H. S., and Popat, K., Human Interactive Proofs and Document Image Analysis," Proc., 5th IAPR Workshop on Document Analysis Systems, Princeton, N.J., Aug. 19-21, 2002

[3] CAPTCHA website, http://www.captcha.net, 2000

[4] Chen, N., Byan, http://drive.to/research

[5] Chew, M. and Baird, H. S., BaffleText: a Human Interactive Proof," Proc., 10th IS&T/SPIE Document Recognition & Retrieval Conf., Santa Clara, Calif., Jan. 22, 2003

[6] Coates, A., Baird, H., and Fateman, R., Pessimal print: a reverse Turing test, Proc. IAPR $6^{th}$ Int'l Conf. on Document Analysis and Recognition, Seattle, Wash., Sep. 10-13, 2001, pp. 1154-1158

[7] Colmenarez A. and Huang, T. S., Face detection with information-based maximum discrimination, Proc. of IEEE CVPR, pp., 782-788, 1997

[8] Mori, G. and Malik, J., Recognizing objects in adversarial clutter: breaking a visual CAPTCHA, Proc. of IEEE CVPR, 2003

[9] Viola, P. and Jones, M., Robust real-time object detection, Proc. of Second Int'l workshop on statistical and computational theories of vision—modeling, learning, computing and sampling, Vancouver, Jul. 13, 2001,

[10] Yan, S. C., Li, M. J., Zhang, H. J., and Cheng., Q. S., Ranking Prior Likelihoods for Bayesian Shape Localization Framework, Submitted to IEEE ICCV 2003.

[11] Yang, M., Kriegman, D., and Ahuja, N., Detecting faces in images: a survey, IEEE Trans. on Pattern analysis and machine intelligence, Vol. 24, No. 1, January 2002.

[12] Yang, M., Roth, D., and Ahuja, N., A SNoW-Based Face Detector, Advances in Neural Information Processing Systems 12 (NIPS 12), S. A. Solla, T. K. Leen and K.-R. Muller (eds), pp. 855-861, MIT Press, 2000.

[13] Zhang, Z., Zhu, L., Li, S. and Zhang, H, Real-time multiview face detection, Proc. Int'l Conf. Automatic Face and Gesture Recognition, pp. 149-154, 2002

Wherefore, what is claimed is:

1. A computer-implemented process for determining whether a computer user is a human or a computer program, comprising the process actions of:

using a computer for generating a human interactive proof employing an image of one or more deformed body parts wherein features of the deformed body parts are at known locations in said image wherein generating the human interactive proof comprises:

inputting a first texture map and a generic model of a body part;

generating a confusion texture map which distributes features of the body part differently from the first texture map;

generating a transformation of a pose of the body part using the generic model;

performing local deformations to features of the body part using the generic model;

generating an image with the deformed and transformed body part with the confusion texture map applied to be used as a test image in the human interactive proof;

requiring a computer user to locate at least one feature of said one or more deformed body part in the image;

comparing the computer user's locations of said at least one feature of said deformed body part to its known location in the image created using the deformed and transformed body part with the confusion texture map applied; and determining whether the computer user is a human or a computer program using the comparison of the computer user's location of said at least one feature to the known location and outputting this determination.

2. The computer-implemented process of claim 1 wherein said one or more deformed body parts is a human face.

3. The computer-implemented process of claim 1 wherein said one or more deformed body parts is an entire human body.

4. The computer-implemented process of claim 1 wherein said one or more deformed body parts is an animal.

5. The computer-implemented process of claim 1 wherein said determination of whether a computer user is a human or a computer program is used for one of:

assigning an email account;
validating an input in a poll;
using a search engine;
using a chat room; and
accessing data on a website.

6. The computer-implemented process of claim 1 wherein computer-user-identified feature locations are specified by the user using a computer pointing device.

7. A computer-implemented process for determining whether a computer user is a human or a computer program, comprising the process actions of:

using a computing device for generating a human interactive proof employing an image of one or more deformed body parts wherein features thereof are at known locations in said image, comprising:

inputting a first texture map, $T_m$, and a generic model of a body part;

generating a confusion texture map, $T_c$, which distributes features of the body part differently than from the first texture map;

generating a transformation of a pose of said body part using said generic model;

performing local deformations to features of said body part;

generating an image, $F_h$, with a deformed and transformed mesh with the first texture applied;

generating an image, $F_c$, with the deformed and transformed mesh with the confusion texture map applied;

generating an image, $I_1$, with $F_c$ as background and a shrunken $F_h$ as foreground;

generating an image, $I_2$, by making L copies of the confusion texture map that are scaled down in size and put into b with varying sizes and locations;

generating an image, $I_3$, by making a number of copies of $F_c$ and randomly putting these copies of $F_c$ into $I_2$, dividing the image, $I_3$, into M+1 regions, where M of the regions come from $F_c$ and one region comes from $F_h$;

calculating the average intensity of the M regions and remapping the intensity of each region such that the average intensities are uniformly distributed across the M+1 regions;

randomly dividing each of the M+1 regions said region into four quadrants and increasing the intensity of some quadrants, while decreasing the intensity of other quadrants; and generating a final image, $I_F$, to be used as the image of the human interactive proof employing an image by making N copies of the feature regions in $F_h$ and randomly putting said N copies into 13 to generate the final test image $I_F$;

requiring a computer user to locate at least one feature of said one or more deformed body parts in the image;

comparing the computer user's locations of said at least one feature of said one or more body deformed parts to their known location in the image; and determining whether the computer user is a human or a computer program based on the comparison of the computer user's locations to the known locations and outputting this determination.

8. A system for creating a Human Interactive Proof using an image of a face, the system comprising:

a general purpose computing device; and a computer program comprising program modules executed by the computing device, the computer program modules further comprising modules to, generate a human interactive proof employing an image of a deformed human face wherein features of the deformed human face are at known locations in said image, wherein the module for generating a human interactive proof comprises sub-modules for:

inputting a first texture map, $T_m$, and a generic model of a face;

generating a confusion texture map, $T_c$, which distributes features of the face differently than from the first texture map;

generating a transformation of a pose of the face using said generic model;

performing local deformations to features of the face;

generating an image, $F_h$, with a deformed and transformed mesh with the first texture applied;

generating an image, $F_c$, with the deformed and transformed mesh with the confusion texture map applied;

generating an image, $I_1$, with $F_c$ as background and a shrunken $F_h$ as foreground;

generating an image, $I_2$, by making L copies of the confusion texture map that are scaled down in size and put into $I_1$ with varying sizes and locations generating an image, $I_3$, by making a number of copies of $F_c$ and randomly putting these copies of $F_c$ into $I_2$;

dividing the image, $I_3$, into M+1 regions, where M of the regions come from $F_c$ and one region comes from $F_h$;

calculating the average intensity of the M regions and remapping the intensity of each region such that the average intensities are uniformly distributed across the M+1 regions;

randomly dividing each of the M+1 regions, said region into four quadrants and increasing the intensity of some quadrants, while decreasing the intensity of other quadrants; and generating a final image, $I_F$, to be used as the image of the human interactive proof employing an image by making N copies of feature regions in $F_h$ and randomly putting said N copies into $I_3$ to generate the final test image $I_F$;

require a computer user to locate certain features of said deformed face in the image;

compare the computer user's locations of said features of said deformed face to their actual location in the image; and determine whether the computer user is a human or a bot based on the comparing and output this determination.

9. The system of claim 8 wherein the image is automatically synthesized.

10. The system of claim 8 wherein the image is a distorted face embedded in a cluttered background.

11. The system of claim 8 wherein the module to determine whether a computer user is a human or a bot determines that the computer user is a human if the computer user's locations of said features are within a given distance from their actual location.

12. The system of claim 8 wherein the features of the deformed face comprise the four corners of the eyes and the two corners of the mouth.

13. The system of claim 8 wherein the image is generated to include at least one of:

non-frontal faces faces that are non-symmetrical;

various lighting and shading conditions; and a background that contains face-like clutter.

14. The system of claim 8 wherein the determination of whether the user is a human or a computer program is made without human intervention.

15. The system of claim 8 wherein the user points to the feature points with a computer input device.

16. The system of claim 15 wherein the computer input device is a mouse.

17. The system of claim 8 wherein the inputs to generate the image are a 3D wire model of a generic head and a cylindrical texture map $T_m$ of an arbitrary person.

18. The system of claim 8 wherein the image size is 512× 512 pixels.

19. The system of claim 8 wherein the image in the human interactive proof is test image $I_F$ with ground truth of face locations and facial feature locations.

20. A computer-readable storage medium having computer-executable instructions stored thereon for creating a test to determine whether a user is a person or a bot, said computer executable instructions comprising:

inputting a 3D wire model of a generic head with a face and a first texture map of an arbitrary person; and generating a human interactive proof using said generic head model and the first texture map, by:

inputting the first texture map, $T_m$, and the generic model of a head with the face;

generating a confusion texture map, $T_c$, which distributes features of the face differently than from the first texture map;

generating a transformation of a pose of the face using the generic model;

performing local deformations to features of the face;

generating an image, $F_h$, with a deformed and transformed mesh with the first texture applied;

generating an image, $F_c$, with the deformed and transformed mesh with the confusion texture map applied;

generating an image, $I_1$, with $F_c$ as background and a shrunken $F_h$ as foreground;

generating an image, $I_2$, by making L copies of the confusion texture map that are scaled down in size and put into $I_1$ with varying sizes and locations generating an image, $I_3$, by making a number of copies of $F_c$ and randomly putting these copies of $F_c$ into $I_2$;

dividing the image, $I_3$, into M+1 regions, where M of the regions come from $F_c$ and one region comes from $F_h$;

calculating the average intensity of the M regions and remapping the intensity of each region such that the average intensities are uniformly distributed across the M+1 regions;

randomly dividing each of the M+1 regions, said region into four quadrants and increasing the intensity of some quadrants, while decreasing the intensity of other quadrants; and generating a final image, $I_F$, to be used as the image of the human interactive proof employing an image by making N copies of the feature regions in $c_h$ and randomly putting said N copies into $I_3$ to generate the final test image $I_F$.

21. The computer-readable storage medium of claim 20 wherein the human interactive proof employs an image of a deformed human face in which face features are at known locations in said image.

22. The computer-readable storage medium of claim 21 wherein a comparison of the locations of said features input by a user is made to their actual location in the image and is used to determine whether the user is a human or a bot.

* * * * *

UNITED STATES PATENT AND TRADEMARK OFFICE
CERTIFICATE OF CORRECTION

PATENT NO.       : 7,725,395 B2                                  Page 1 of 1
APPLICATION NO.  : 10/664657
DATED            : May 25, 2010
INVENTOR(S)      : Yong Rui et al.

It is certified that error appears in the above-identified patent and that said Letters Patent is hereby corrected as shown below:

In column 16, line 7, in Claim 1, after "said" delete "one or more".

In column 16, line 61, in Claim 7, delete "b" and insert -- $I_1$ --, therefor.

In column 16, line 64, in Claim 7, after "$I_2$" insert -- ; --.

In column 17, line 12, in Claim 7, delete "13" and insert -- $I_3$ --, therefor.

In column 17, line 50, in Claim 8, after "locations" insert -- ; --.

In column 18, line 22, in Claim 13, after "faces" insert -- ; --.

In column 18, line 66, in Claim 20, after "locations" insert -- ; --.

In column 20, line 1, in Claim 20, delete "$c_h$" and insert -- $F_h$ --, therefor.

Signed and Sealed this
Seventeenth Day of May, 2011

David J. Kappos
*Director of the United States Patent and Trademark Office*